United States Patent Office 3,140,299
Patented July 7, 1964

3,140,299
DERIVATIVES OF TRIMELLITIC ACID ANHYDRIDES
Donald F. Loncrini, Schenectady, N.Y., assignor to General Electric Company, a corporation of New York
No Drawing. Filed Apr. 27, 1962, Ser. No. 190,808
4 Claims. (Cl. 260—346.3)

This invention relates to new and useful compositions. More particularly, it relates to new anhydride materials and to epoxy resins cured with such anhydrides.

The use of anhydride materials for curing epoxy resins is well known. However, with the development of electrical and other equipment which operates at elevated temperatures and under great physical stress, there has come about a corresponding requirement for new epoxy resin compositions which would be able to meet such requirements. It is a primary object, therefore, of this invention to provide new cured epoxy resin compositions which will be capable of operating at high temperatures. It is a further object of this invention to provide curing agents which make practicable such cured epoxy resin compositions.

Briefly, the invention relates to novel monoanhydrides derived from anhydrides of tricarboxylic acids and to epoxy resins cured with such materials.

Those features of the invention which are believed to be novel are set forth with particularity in the claims appended hereto. The invention will, however, be better understood from a consideration of the following description.

The novel anhydride materials of the present invention correspond to the following general formula

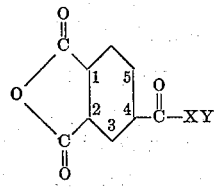

where X can be NH, NY, O, S or,

and Y can be substituted or unsubstituted aromatic, alicyclic, aliphatic or heterocyclic groups.

For example, Y can be an aromatic group such as pheny, ethyl phenyl, naphthyl, nonyl phenyl or a nitro or halo substituted aromatic group. It can also be aliphatic, for example stearyl, lauryl, nonyl, etc. Among the useful groups are cyclohexyl, cyclobutyl, cyclopentyl and derivatives thereof. Others will occur to those skilled in the art.

Generally speaking, the anhydrides of the present invention can be readily prepared in quantitative yields by an acidolysis reaction between equimolar amounts of tricarboxy acid or anhydride and an ester or amide. This acidolysis reaction is unique in the sense that the reaction takes place on the No. 4 carboxylic acid position, thus, leaving the 1,2 positions intact. For example, in the care of trimellitic anhydride, only the free carboxylic acid group reacts leaving intact the anhydride linkage. If trimellitic acid is used, then the 1,2-dicarboxylic acid groups form the anhydride by splitting out one molecule of water before the transesterification reaction proceeds. In either case, the reaction products are the same. Among the other tribasic materials which can be used besides trimellitic anhydride or its acid are 1,2,4 - naphthalene tricarboxylic acid, 1,4,8 - napthalene tricarboxylic acid, 1,2,4 - butane tricarboxylic acid, 1,2,3 - benzene tricarboxylic acid, 1,2,3 - propane tricarboxylic acid and 2,3-6-napthalene tricarboxylic acids or their corresponding anhydrides, among others. In preparing the anhydrides, equimolar parts of an ester or amide are reacted with one part of trimellitic anhydride, for example, or other tribasic material as described above either in the presence or absence of solvents and with or without catalysts of the transesterification type. Among the solvents which are useful in connection with the present invention are the chlorinated aromatic materials. Among the transesterification catalysts which are well known to those skilled in the art are MgO, Mg, $Li_2CO_3$, $H_2SO_4$, $HgSO_4$, etc. Generally, reaction takes place in a temperature range of from about 125° C. to 300° C. and is complete when the theoretical amount of lower boiling acid has been removed by distillation. Normally, this takes place between 30 and 100 minutes. In general, any ester acid derivative of the hydroxy, amino or mercapto compound can be used such as formate, acetate, propionate, and the like. However, from the point of view of convenience and preparation and cheapness of raw materials, the acetates are generally preferred, except, of course, when the corresponding ester, amide or thioester is of such low boiling point that no reaction takes place. In such case, other higher boiling point derivatives are employed.

Any 1,2 epoxy resins containing an average of more than one epoxy group per resin molecule may be used, such epoxy resins derived from various source materials being well known in the art. Epoxy resins are described, for example, in U.S. Patent 2,324,483 relating to epoxy resins which are the reaction product of a phenol containing two phenolic hydroxy groups and an epihalohydric, such as epichlorohydrin, in which the product contains at least two epoxy groups. Typical phenols which are used include 2,2-bis-(4-hydroxyphenyl) propane resorcinol, 2,2-bis-(4-hydroxyphenyl) butane and others. Further examples of epoxy resins are disclosed in U.S. Patents 2,494,295, 2,500,600 and 2,511,913. These epoxy resins are generally known as glycidyl epoxy resins and a typical reaction for preparing such an epoxy resin from the reaction of epichlorohydrin with 2,2-bis-(4-hydroxyphenyl)-propane is shown below:

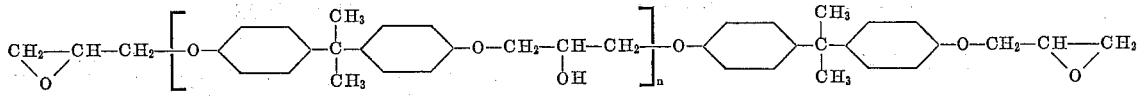

Where n has an average value varying from around zero to about 9. Many of these ethoxyline resins are sold under the name of Epon resins by Shell Chemical Corporation, or Araldite resins by the Ciba Company.

Data on several of the Epon resins found suitable for the instant purpose are given in the table below:

| Epoxy Resin | Epoxide Equivalent | M.P., ° C. |
|---|---|---|
| Epon 562 | 140–165 | Liquid. |
| Epon 820 | 192 | Do. |
| Epon 826 | 175–190 | Do. |
| Epon 828 | 192 | 9. |
| Epon 834 | 225–290 | 20–23. |
| Epon 1064 | 300–375 | 40–45. |
| Araldite 6010 | 192 | Liquid. |
| Araldite 6020 | 200–205 | Do. |
| ERL 2774 | 175–200 | Do. |
| Epi-Rez 510 | 175–200 | Do. |
| Bakelite 2774 | 190–196 | Do. |

Other types of epoxy resins may also be used in conjunction with the present invention, including epoxidized novolac materials, aliphatic materials such as epoxidized polyolefins and soybean oil, and cyclic aliphatic epoxy materials such as dicyclopentadiene dioxide. From the above, it will be gathered that any 1,2 epoxy resin containing an average of more than one epoxy group per resin molecule is useful in connection with the present invention.

The following examples illustrate the preparation of the novel anhydrides of the invention.

Example 1

A mixture of 96 grams (0.5 mole) of trimellitic anhydride, together with 103 grams (0.5 mole) of p-phenylphenyl acetate and 100 cc. of Aroclor No. 1242, a chlorinated polyphenyl material, was stirred and heated to a maximum temperature of 310° C. over a two-hour period. A total of 29 grams of acetic acid was collected and the mixture allowed to cool to 80° C. The product was precipitated with 200 cc. of n-hexane, filtered, washed three times with boiling n-hexane and dried. There was obtained a yield of 163 grams of product corresponding to 97% of theory and having a melting point of 221 to 222° C. and a neutral equivalent of 174. This material can be characterized as 4-p-phenylphenyl trimellitate anhydride.

Example 2

A mixture of 96 grams (0.5 mole) of trimellitic anhydride, 67.5 grams (0.5 mole) of acetanilide and 300 cc. of diphenyl ether was stirred and heated to a maximum temperature of 260° C. over a two-hour period. A total of 29.7 grams of acetic acid was distilled over corresponding to a yield of 99% of the theoretical. After cooling to 100° C., the product was filtered, washed three times in boiling n-hexane and dried to give a total of 136 grams or a 90% yield having a melting point of 225° C. to 226° C. and a neutral equivalent of 129. This material is 4-phenyl trimellitamide anhydride.

Example 3

There were mixed together 192 grams (1.0 mole) of trimellitic anhydride and 270 grams (1.01 moles) of nonylphenyl acetate, which was prepared by the acetylation of nonylphenol wtih acetic anhydride, the mixture being heated to a top temperature of 290° C. over a two-hour period. Sixty grams of acetic acid distilled over and the mixture cooled to a viscous mass. A portion of the viscous mass was crystallized in n-hexane as above to a fine powder melting at 154° C. to 156° C. and having a neutral equivalent of 195. This material is 4-nonylphenyl trimellitate anhydride.

Example 4

A mixture of 57.6 grams (0.3 mole) of trimellitic anhydride and 93.3 grams (0.3 mole) of stearylacetamide was stirred and heated over a 15-minute period to a maximum temperature of 180° C., during which time there were collected 18 grams of acetic acid. This mixture was cooled to 80° C. and 400 cc. of n-heptane added and the product filtered. After recrystallizing in n-heptane, there were obtained 130 grams or a 99% yield of waxy 4-stearyl trimellitamide anhydride having a melting point of 126° C. and a neutral equivalent of 222.

Example 5

There were reacted together over a one-hour period, to a maximum temperature of 310° C., 96 grams (0.5 mole) of trimellitic anhydride with 156 grams (0.5 mole) of stearyl acetate. There were also obtained, by precipitating in n-hexane and recrystallizing as in Example 1, 210 grams or a 95% yield of 4-stearyl trimellitate anhydride melting at 98° C. and having a neutral equivalent of 221.

Example 6

The procedure of Example 4 was repeated using 76.8 grams (0.4 mole) of trimellitic anhydride with 90 grams (0.4 mole) of laurylacetamide. The product obtained weighed 140 grams for 98% yield of 4-lauryl trimellitamide anhydride which melted at 135° C. and had a neutral equivalent of 186.

Example 7

There were mixed together 21.3 grams of finely pulverized 4-p-phenylphenyl trimellitate anhydride of Example 1 with 15 grams of Epon 562. The mixture was placed in an aluminum dish in a 125° C. air-draft oven. The mixture gelled after about 15 minutes and was fully cured after two hours to a hard, rigid mass. Aging for four hours at 150° C. produced no changes in property nor did aging for two hours at 210° C. The cured resin was found to be strongly anchored to the aluminum metal of the dish.

Example 8

The powdered 4-phenyl-trimellitamide anhydride of Example 2 was mixed with Epon 562 in the proportion of 0.8 mole of anhydride per epoxy equivalent. The mixture cured to a tough, rigid, infusible mass at 125° C. in about two hours.

Example 9

The 4-nonylphenyl trimellitate anhydride of Example 3 was mixed with Epon 562 in the proportion of 0.6 mole of anhydride per epoxy equivalent. The material cured to a tough, flexible, infusible mass at 125° C. in about two hours. The cured epoxy resin was found to be tough and flexible at room temperature as well and was characterized by good adhesion to aluminum.

Example 10

The 4-nonylphenyl trimellitate anhydride of Example 3, which had been crystallized in n-hexane, was combined with Epon 826 in the proportion of 0.6 mole of anhydride per epoxy equivalent and cured for two hours at 125° C. to obtain a tough, flexible material. This material, at a temperature of 185° C., was extremely pliable but still retained its toughness.

Example 11

The 4-stearyl trimellitamide anhydride of Example 4 was mixed with Epon 562 in the amount of 0.8 mole of anhydride per epoxy equivalent. This material, when cured for four hours at 125° C., produced a tough, flexible cast material.

Example 12

The 4-stearyl trimellitate anhydride, when mixed with Epon 562 in an amount of 0.8 mole of anhydride per epoxy equivalent and cured for two hours at 125° C., produced a tough, flexible material.

Example 13

The 4-lauryl trimellitamide anhydride of Example 6, when mixed with Epon 562 in the amount of 0.8 mole of anhydride per epoxy equivalent and cured for four hours at 125° C., produced, again, a tough, flexible casting.

There are provided then by the present invention novel anhydrides which are useful, for example, curing epoxy resins to provide materials having good physical and electrical characteristics.

What I claim as new and desire to secure by Letters Patent of the United States is:

1. An anhydride chosen from the group consisting of 4-p-phenylphenyl trimellitate anhydride, 4-phenyl trimellitamide anhydride and 4-nonylphenyl trimellitate anhydride.
2. 4-p-phenylphenyl trimellitate anhydride.
3. 4-phenyl trimellitamide anhydride.
4. 4-nonylphenyl trimellitate anhydride.

References Cited in the file of this patent

UNITED STATES PATENTS

| | | |
|---|---|---|
| 2,500,600 | Bradley | Mar. 14, 1950 |
| 2,817,644 | Shokal et al. | Dec. 24, 1957 |
| 2,890,204 | Delmonte | June 9, 1959 |
| 2,911,416 | Knobloch et al. | Nov. 3, 1959 |
| 3,002,003 | Merrill et al. | Sept. 26, 1961 |
| 3,022,320 | Bennett et al. | Feb. 20, 1962 |
| 3,027,400 | McKinnis et al. | Mar. 27, 1962 |
| 3,063,969 | Stephens et al. | Nov. 13, 1962 |